United States Patent
Shirao

(10) Patent No.: US 9,031,760 B2
(45) Date of Patent: *May 12, 2015

(54) WHEEL LOADER AND METHOD FOR CONTROLLING A WHEEL LOADER

(71) Applicant: Komatsu Ltd., Tokyo (JP)

(72) Inventor: Atsushi Shirao, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/133,742

(22) Filed: Dec. 19, 2013

(65) Prior Publication Data

US 2014/0180551 A1    Jun. 26, 2014

Related U.S. Application Data

(63) Continuation of application No. 13/700,412, filed as application No. PCT/JP2012/062350 on May 15, 2012, now Pat. No. 8,639,429.

(30) Foreign Application Priority Data

Mar. 30, 2012   (JP) ................................. 2012-078942

(51) Int. Cl.
  *B60T 7/12*   (2006.01)
  *E02F 3/28*   (2006.01)
  (Continued)

(52) U.S. Cl.
  CPC ............ *E02F 3/28* (2013.01); *B60W 30/18172* (2013.01); *F16H 61/421* (2013.01);
  (Continued)

(58) Field of Classification Search
  CPC .............. B60W 30/19172; B60W 2510/1085; B60W 2510/305; F16H 61/421; F16H 61/472; F16H 61/4017; E02F 9/2253; E02F 3/422; E02F 9/2292; E02F 3/36; E02F 3/28; E02F 3/283; E02F 9/2289
  USPC ....... 701/50, 82; 180/307; 37/414; 172/4.5, 9
  See application file for complete search history.

(56) References Cited

U.S. PATENT DOCUMENTS 4,017,739 A * 4/1977 Hapeman et al. ............... 290/14
4,776,751 A * 10/1988 Saele ............................ 414/699
(Continued)

FOREIGN PATENT DOCUMENTS

EP   2 131 072 A1   12/2009
JP   7-229560 A     8/1995
(Continued)

OTHER PUBLICATIONS

International Search Report for PCT/JP2012/062350, issued on Jul. 24, 2012.
(Continued)

*Primary Examiner* — Gertrude Arthur Jeanglaud
(74) *Attorney, Agent, or Firm* — Global IP Counselors, LLP

(57) ABSTRACT

A tractive force control part of a wheel loader is configured to perform a tractive force control to reduce a maximum tractive force. The tractive force control part is further configured to reduce the maximum tractive force when determination conditions including, while a working implement is performing excavation operation, that the working implement is in a raising hydraulic stall condition and that a drive circuit pressure is greater than or equal to a predetermined hydraulic pressure threshold are satisfied during the tractive force control.

18 Claims, 13 Drawing Sheets

(51) Int. Cl.
  *B60W 30/18*    (2012.01)
  *F16H 61/421*   (2010.01)
  *F16H 61/472*   (2010.01)
  *E02F 9/22*     (2006.01)
  *E02F 3/36*     (2006.01)
  *F16H 61/4017*  (2010.01)
  *E02F 3/42*     (2006.01)

(52) U.S. Cl.
  CPC ...... *F16H61/472* (2013.01); *B60W 2510/1085* (2013.01); *B60W 2510/305* (2013.01); *E02F 9/2253* (2013.01); *E02F 9/2289* (2013.01); *E02F 9/2292* (2013.01); *E02F 9/2296* (2013.01); *E02F 3/36* (2013.01); *F16H 61/4017* (2013.01); *E02F 3/283* (2013.01); *E02F 3/422* (2013.01)

(56) References Cited

U.S. PATENT DOCUMENTS

| | | | |
|---|---|---|---|
| 6,234,254 | B1 | 5/2001 | Dietz et al. |
| 6,321,535 | B2 | 11/2001 | Ikari et al. |
| 8,386,136 | B2 | 2/2013 | Shirao et al. |
| 8,418,798 | B2 * | 4/2013 | Mori et al. ............ 180/307 |
| 8,532,886 | B1 | 9/2013 | Shirao et al. |
| 8,639,429 | B2 * | 1/2014 | Shirao ............ 701/82 |
| 2010/0094515 | A1 | 4/2010 | Shirao et al. |
| 2010/0154399 | A1 | 6/2010 | Bergstrom et al. |

FOREIGN PATENT DOCUMENTS

| | | |
|---|---|---|
| JP | 2004-24172 A | 1/2004 |
| JP | 2008-144942 A | 6/2008 |
| JP | 2011-63945 A | 3/2011 |
| WO | 2011/027758 A1 | 3/2011 |
| WO | 2011/108353 A1 | 9/2011 |

OTHER PUBLICATIONS

The European Search Report for the corresponding European application No. 12791680.7, issued on Mar. 3, 2014.

* cited by examiner

WHEEL LOADER AND METHOD FOR CONTROLLING A WHEEL LOADER

CROSS-REFERENCE TO RELATED APPLICATIONS

This application is a continuation application of U.S. patent application Ser. No. 13/700,412. This application claims priority to Japanese Patent Application No. 2012-078942 filed on Mar. 30, 2012. The entire disclosures of U.S. patent application Ser. No. 13/700,412 and Japanese Patent Application No. 2012-078942 are hereby incorporated herein by reference.

TECHNICAL FIELD

The present invention is related to a wheel loader and a method for controlling a wheel loader.

BACKGROUND ART

Among wheel loaders there are wheel loaders mounted with what is called HST (Hydro Static Transmission). In an HST type wheel loader an engine drives a hydraulic pump and a traveling hydraulic motor is driven by hydraulic fluid discharged from a hydraulic pump. This is how the wheel loader is made to travel. In an HST type wheel loader speed and tractive force can be controlled by controlling engine rotation speed, displacement of the hydraulic pump and displacement of the hydraulic motor for driving the wheel loader. (Japanese Unexamined Patent Publication No. 2008-144942).

The operator of such a wheel loader can implement tractive force control selectively. Tractive force may for example, limit displacement of a traveling hydraulic motor to an upper limit displacement less than maximum displacement, thereby reducing maximum tractive force. The operator may choose to implement tractive force control if slip or stall phenomena occur due to excessive tractive force. Doing so reduces maximum tractive force suppressing the occurrence of phenomena such as slip or stall and the like

SUMMARY

Some types of wheel loader are constructed such that the operator can select the level of maximum tractive force with tractive force control. The operator can select the level of maximum tractive force control using tractive force control in advance. Once the operator operates a switch that implements tractive force control, maximum tractive force is limited to the selected level, thereby enabling the operator to select the appropriate level of tractive force in relation to for example, the condition of a road surface.

The level of tractive force required is not constant however and may vary with work conditions. Therefore it is not easy for an operator to select the optimum level of maximum tractive force in advance to prevent the occurrence of phenomena such as stalling or slipping and the like. Accordingly, in the case of a conventional wheel loader, the operator is forced to continually reselect the level of maximum tractive force during excavation work in response to changing work conditions.

For example, even when maximum tractive force is reduced to a predetermined level using tractive force control as described above, during excavation a working implement can go into a condition of raising hydraulic stall. In a raising hydraulic stall condition, despite performing the operation to raise the boom in order to raise the bucket (hereinafter referred to as "boom raise operation"), the boom does not rise. The condition of raising hydraulic stall often occurs during what is called the "scooping in operation" which is the operation of scooping the material being worked such as earth and sand and the like into the bucket. In a scooping in operation the bucket is raised while pushing the bucket into the earth and sand by advancing the vehicle forward. At this time a counterforce is exerted against the bucket opposing the tractive force advancing the vehicle. If the load operating against the bucket due to this counterforce becomes excessive, raising the bucket becomes difficult. Moreover, if the load becomes greater than the drive force of the lift cylinder that raises the bucket, it may not be possible to raise the bucket so that the working implement enters the raising hydraulic stall condition as above. When this happens, the operator must perform an operation to reduce the level of maximum tractive force, then when the working implement recovers from the raising hydraulic stall condition, the operator must perform another operation to return the maximum tractive force to the original level. Having to perform these operations is troublesome and reduces wheel loader operability.

An object of the present invention is to provide a wheel loader and a method for controlling a wheel loader that enables recovery from the raising hydraulic stall condition affecting a working implement during excavation and provides improved operability.

A wheel loader according to one aspect includes a working implement, an engine, a first hydraulic pump, a traveling hydraulic motor, a second hydraulic pump, a working implement operating member, a drive circuit pressure detection part, a raising hydraulic stall determination part, a drive circuit pressure determination part, and a tractive force control part. The working implement includes a boom, a bucket and a lift cylinder that raises the bucket by moving the boom. The first hydraulic pump is driven by the engine. The traveling hydraulic motor is driven by hydraulic fluid discharged from the first hydraulic pump. The second hydraulic pump is driven by the engine to discharge hydraulic fluid that drives the lift cylinder. The working implement operating member is configured to operate the working implement. The drive circuit pressure detection part is configured to detect a drive circuit pressure that is a pressure of the hydraulic fluid for driving the traveling hydraulic motor. The raising hydraulic stall determination part is configured to determine whether or not the working implement is in a raising hydraulic stall condition, in which the bucket does not rise regardless of operation of the working implement operating member. The drive circuit pressure determination part is configured to determine whether or not the drive circuit pressure is greater than or equal to a predetermined hydraulic pressure threshold. The tractive force control part is configured to perform a tractive force control to reduce a maximum tractive force. The tractive force control part is further configured to reduce the maximum tractive force when determination conditions including, while the working implement is performing excavation operation, that the working implement is in the raising hydraulic stall condition and that the drive circuit pressure is greater than or equal to the predetermined hydraulic pressure threshold are satisfied during the tractive force control.

According another aspect, a method is provided for controlling a wheel loader including an engine and a working implement including a boom, a bucket and a lift cylinder that raises the bucket by moving the boom. The method includes: determining whether or not a raising hydraulic stall condition is occurring, in which the bucket does not rise even though hydraulic fluid discharged from a second hydraulic pump, which is driven by the engine, is supplied to the lift cylinder;

determining whether or not a drive circuit pressure of a drive circuit, through which hydraulic fluid discharged from a first hydraulic pump driven by the engine is supplied to a traveling hydraulic motor, is greater than or equal to a predetermined hydraulic pressure threshold; and, during a tractive force control for reducing a maximum tractive force is performed, further reducing a maximum tractive force when determination conditions including, while the working implement is performing excavation operation, that the raising hydraulic stall condition is occurring and that the drive circuit pressure is greater than or equal to the predetermined hydraulic pressure threshold are satisfied.

BRIEF DESCRIPTION OF THE DRAWINGS

FIG. 13 is a flow chart showing the processes for determining whether or not a boom pressure lower flag is ON.

DESCRIPTION OF EMBODIMENTS

Figure 1:
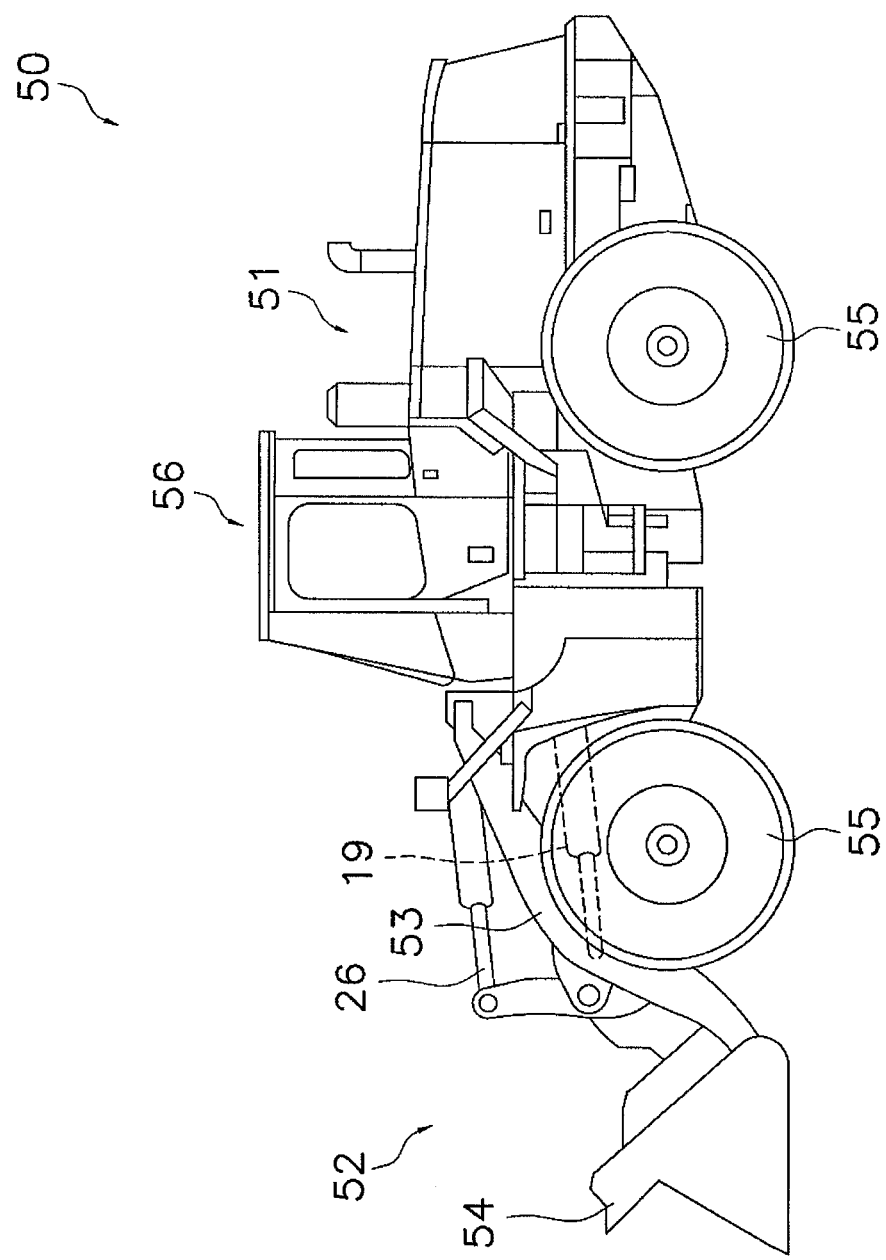
FIG. 1 is a side view of a wheel loader according to an embodiment of the present invention.

A wheel loader 50 according to a first embodiment of the present invention will now be described with reference to the drawings. FIG. 1 is a side view of the wheel loader 50. The wheel loader 50 includes a body 51, a working implement 52, a plurality of tires 55, and a cab 56. The working implement 52 is installed at the front part of the body 51. The working implement 52 includes a boom 53, a bucket 54, a lift cylinder 19 and a bucket cylinder 26. The boom 53 is a member used for lifting up the bucket 54. The boom 53 is driven by the lift cylinder 19. The bucket 54 is attached at the end of the boom 53. The bucket 54 can be made to dump or tilt by the bucket cylinder 26. The bucket cylinder 26 raises the bucket 54 by moving the boom 53. The cab 56 is placed in position over the body 51.

Figure 2:
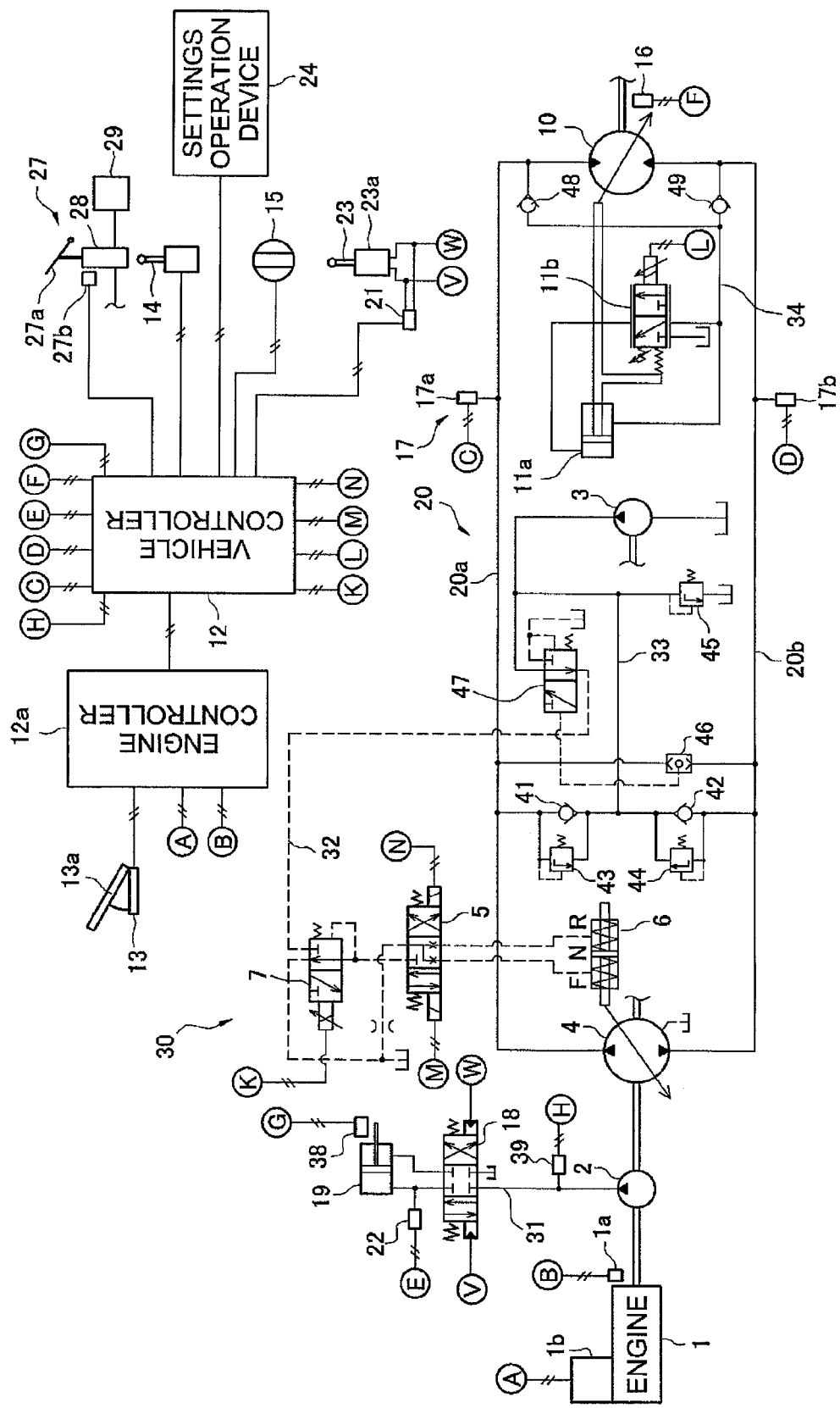
FIG. 2 is a block diagram of the configuration of a hydraulic driving mechanism mounted on the wheel loader.

FIG. 2 is a block diagram of the configuration of a hydraulic drive mechanism 30 mounted on the wheel loader 50. A hydraulic drive mechanism 30 includes chiefly, an engine 1, a first hydraulic pump 4, a second hydraulic pump 2, a charge pump 3, a traveling hydraulic motor 10, an engine controller 12a, a vehicle controller 12 and a drive hydraulic circuit 20. In the hydraulic drive mechanism 30, the first hydraulic pump 4 discharges hydraulic fluid as it is driven by the engine 1. The traveling hydraulic motor 10 is driven by hydraulic fluid discharged from the first hydraulic pump 4. The traveling hydraulic motor 10 moves the wheel loader 50 by driving the above-mentioned tires 55 to rotate. That is to say, the hydraulic drive mechanism 30 employs what is called a 1 pump 1 motor HST system.

The engine 1 is a diesel engine. Output torque generated at the engine 1 is conveyed to the second hydraulic pump 2, the charge pump 3 and the first hydraulic pump 4. An engine rotation speed sensor 1a that detects actual rotation speed of the engine 1 is installed in the hydraulic drive mechanism 30. The engine rotation speed sensor 1a is an example of the engine rotation speed detection part of the present invention. Further, a fuel injection device 1b is connected to the engine 1. The engine controller 12a described subsequently, controls the rotation speed and output torque (hereinafter "engine torque") of the engine 1 by controlling the fuel injection device 1b.

The first hydraulic pump 4 discharges hydraulic fluid as it is driven by the engine 1. The first hydraulic pump 4 is a variable displacement type hydraulic pump. Hydraulic fuel discharged from the first hydraulic pump 4 passes the drive hydraulic circuit 20 and is delivered to the traveling hydraulic motor 10. Basically, the drive hydraulic circuit 20 includes a first drive circuit 20a and a second drive circuit 20b. As hydraulic fluid is supplied to the traveling hydraulic motor 10 from the first hydraulic pump 4 via the first drive circuit 20a, the traveling hydraulic motor 10 is driven in one direction (e.g. the forward direction). As hydraulic fluid is supplied to the traveling hydraulic motor 10 from the first hydraulic pump 4 via the second drive circuit 20b, the traveling hydraulic motor 10 is driven in the other direction (e.g. the reverse direction).

A drive circuit pressure detection part 17 is installed in the drive hydraulic circuit 20. The drive circuit pressure detection part 17 detects the pressure of hydraulic fluid (hereinafter "drive circuit pressure") supplied to the traveling hydraulic motor 10 via the first drive circuit 20a or the second drive circuit 20b. Basically, the drive circuit pressure detection part 17 includes a first drive circuit pressure sensor 17a and a second drive circuit pressure sensor 17b. The first drive circuit pressure sensor 17a detects the hydraulic pressure of the first drive circuit 20a. The second drive circuit pressure sensor 17b detects the hydraulic pressure of the second drive circuit 20b. The first drive circuit pressure sensor 17a and the second drive circuit pressure sensor 17b send detection signals to the vehicle controller 12. Further, an FR switching part 5 and a pump displacement control cylinder 6 are connected to the first hydraulic pump 4 for controlling the direction of discharge from the first hydraulic pump 4.

The FR switching part 5 is an electromagnetic control valve that switches the direction of hydraulic fluid supplied to the pump displacement control cylinder 6 based on a control signal from the vehicle controller 12. The FR switching part 5, by switching the direction in which hydraulic oil is supplied to the pump displacement control cylinder 6, switches the direction of discharge from the first hydraulic pump 4. Basically, the FR switching part 5 switches the direction of discharge from the first hydraulic pump 4 between discharge to the first drive circuit 20a and discharge to the second drive circuit 20b. In this way the drive direction of the traveling hydraulic motor 10 is changed. The pump displacement control cylinder 6 is driven by hydraulic oil supplied via a pump pilot circuit 32 and changes the tilting angle of the first hydraulic pump 4.

A pump displacement control part 7 is arranged in the pump pilot circuit 32. The pump displacement control part 7 connects the pump displacement control cylinder 6 to any of the pump pilot circuit 32 and a hydraulic fluid tank. The pump displacement control part 7 is an electromagnetic control valve controlled based on control signals from the vehicle controller 12. The pump displacement control part 7 adjusts the tilting angle of the first hydraulic pump 4 by controlling the pressure of hydraulic fluid inside the pump displacement control cylinder 6.

The pump pilot circuit 32 is connected to a charge circuit 33 and a hydraulic fluid tank via a cutoff valve 47. The pilot port of the cutoff valve 47 is connected to the first drive circuit 20*a* and the second drive circuit 20*b* via a shuttle valve 46. The shuttle valve 46 introduces whichever hydraulic pressure is greatest between the first drive circuit 20*a* and the second drive circuit 20*b* to the pilot port of the cutoff valve 47. That is to say, drive circuit pressure is applied to the pilot port of the cutoff valve 47. The cutoff valve 47 links the charge circuit 33 and the pump pilot circuit 32 when drive circuit pressure is below a predetermined cutoff pressure. In this way hydraulic fluid is supplied from the charge circuit 33 to the pump pilot circuit 32. When drive circuit pressure is above the predetermined cutoff pressure the cutoff valve 47 links the pump pilot circuit 32 to a hydraulic fluid tank and releases hydraulic fluid of the pump pilot circuit 32 to the hydraulic fluid tank. In this way, the displacement of the first hydraulic pump 4 is reduced by decrease in pressure of the pump pilot circuit 32, preventing a rise in drive circuit pressure.

The charge pump 3, driven by the engine 1, is a pump for supplying hydraulic fluid to the drive hydraulic circuit 20. The charge pump 3 is connected to the charge circuit 33. The charge pump 3 supplies hydraulic fluid to the pump pilot circuit 32 via the charge circuit 33. The charge circuit 33 is connected to the first drive circuit 20*a* via a first check valve 41. The first check valve 41 allows flow of hydraulic fluid from the charge circuit 33 to the first drive circuit 20*a* but restricts flow of hydraulic fluid from the first drive circuit 20*a* to the charge circuit 33. Further, the charge circuit 33 is connected to the second drive circuit 20*b* via a second check valve 42. The second check valve 42 allows flow of hydraulic fluid from the charge circuit 33 to the second drive circuit 20*b* but restricts flow of hydraulic fluid from the second drive circuit 20*b* to the charge circuit 33. Again, the charge circuit 33 is connected to the first drive circuit 20*a* via a first relief valve 43. The first relief valve 43 opens when the hydraulic pressure of the first drive circuit 20*a* is greater than a predetermined pressure. The charge circuit 33 is connected to the second drive circuit 20*b* via a second relief valve 44. The second relief valve 44 opens when the hydraulic pressure of the second drive circuit 20*b* is greater than a predetermined pressure. Further, the charge circuit 33 is connected to a hydraulic fluid tank via a low pressure relief valve 45. The low pressure relief valve 45 opens when the hydraulic pressure of the charge circuit 33 is greater than a predetermined relief pressure. In this way, drive circuit pressure is adjusted so as not to exceed a predetermined relief pressure. The predetermined relief pressure of the low pressure relief valve 45 is low in comparison to the relief pressure of the first relief valve 43 and the relief pressure of the second relief valve 44. Accordingly, when drive circuit pressure is lower than hydraulic pressure of the charge circuit 33, hydraulic fluid is supplied from the charge circuit 33 to the drive hydraulic circuit 20 via the first check valve 41 or the second check valve 42.

The second hydraulic pump 2 is driven by the engine 1. The second hydraulic pump 2 discharges hydraulic fluid to drive the lift cylinder 19. Hydraulic fluid discharged from the second hydraulic pump 2 is supplied to the lift cylinder 19 via a working implement hydraulic circuit 31. Thereby the working implement 52 is driven. The discharge pressure of the second hydraulic pump 2 is detected by a discharge pressure sensor 39. The discharge pressure sensor 39 sends detection signals to the vehicle controller 12. A working implement control valve 18 is installed in the working implement hydraulic circuit 31. The working implement control valve 18 is driven in compliance with the operation amount of a working implement operating member 23. The working implement operating member 23 is a member for operating the working implement 52. The working implement control valve 18 controls the flow rate of hydraulic fluid supplied to the lift cylinder 19 in compliance with pilot pressure applied to a pilot port. Pilot pressure applied to the pilot port of the working implement control valve 18 is controlled by a pilot valve 23*a* of the working implement operating member 23. The pilot valve 23*a* applies pilot pressure to the pilot port of the working implement control valve 18 in compliance with the operation amount of the working implement operating member 23. In this way, the lift cylinder 19 is controlled in compliance with the operation amount of the working implement operating member 23. Pilot pressure applied to the pilot port of the working implement control valve 18 is detected by a PPC pressure sensor 21. The pressure of hydraulic fluid supplied to the lift cylinder 19 is detected by a boom pressure sensor 22. The boom pressure sensor 22 is an example of the boom pressure detection part of the present invention. The PPC pressure sensor 21 and the boom pressure sensor 22 send detection signals to the vehicle controller 12. A boom angle detection part 38 is attached to the lift cylinder 19. The boom angle detection part 38 detects the angle of the boom as described subsequently. The boom angle detection part 38 is a sensor for detecting the angle of rotation of the boom 53. Alternatively, it is also suitable for the boom angle detection part 38 to detect the length of stroke of the lift cylinder 19 such that the rotation angle of the boom 53 can be calculated from that length of stroke. The boom angle detection part 38 sends detection signals to the vehicle controller 12. The bucket cylinder 26 is also controlled by a control valve in the same manner as the lift cylinder 19, however this valve is omitted from FIG. 2.

The traveling hydraulic motor 10 is a variable displacement type hydraulic motor. The traveling hydraulic motor 10 is driven by hydraulic fluid discharged from the first hydraulic pump 4, to generate drive force that facilitates travel. A motor cylinder 11*a* and motor displacement control part 11*b* are installed to the traveling hydraulic motor 10. The motor cylinder 11*a* changes the tilting angle of the traveling hydraulic motor 10. The motor displacement control part 11*b* is an electromagnetic valve controlled based on control signals from the vehicle controller 12. The motor displacement control part 11*b* controls the motor cylinder 11*a* based on control signals from the vehicle controller 12. The motor cylinder 11*a* and the motor displacement control part 11*b* are connected to a motor pilot circuit 34. The motor pilot circuit 34 is connected to the first drive circuit 20*a* via a check valve 48. The check valve 48' allows flow of hydraulic fluid from the first drive circuit 20*a* to the motor pilot circuit 34 but restricts flow of hydraulic fluid from the motor pilot circuit 34 to the first drive circuit 20*a*. The motor pilot circuit 34 is connected to the second drive circuit 20*b* via a check valve 49. The check valve 49 allows flow of hydraulic fluid from the second drive circuit 20*b* to the motor pilot circuit 34 but restricts flow of hydraulic fluid from the motor pilot circuit 34 to the second drive circuit 20b. Through operation of the check valve 48 and the check valve 49, whichever hydraulic pressure is greatest between the first drive circuit 20a and the second drive circuit 20b, in other words drive circuit pressure hydraulic fluid, is supplied to the motor pilot circuit 34. The motor displacement control part 11b switches the supply flow volume and direction of supply of hydraulic fluid to the motor cylinder 11a from the motor pilot circuit 34, based on control signals from the vehicle controller 12. In this way, the vehicle controller 12 can freely change the displacement of the traveling hydraulic motor 10. Further, it enables the upper limit displacement and lower limit of displacement of the traveling hydraulic motor 10 to be set as required.

A vehicle speed sensor 16 is installed on the hydraulic drive mechanism 30. The vehicle speed sensor 16 detects vehicle speed. The vehicle speed sensor 16 sends detection signals to the vehicle controller 12. The vehicle speed sensor 16 detects vehicle speed by for example, detecting the rotation speed of the tire drive shaft.

The wheel loader 50 includes an accelerator operation member 13a, a forward/reverse control member 14, a tractive force operating member 15, an inching operation part 27 and a settings operation device 24.

The accelerator operation member 13a is a member that enables an operator to set a target rotation speed for the engine 1. The accelerator operation member 13a is for example, an accelerator pedal operated by the operator. The accelerator operation member 13a is connected to an accelerator operation sensor 13. The accelerator operation sensor 13 is comprised for example as a potentiometer. The accelerator operation sensor sends detection signals showing operation amount of the accelerator operation member 13a (hereinafter "accelerator operation amount") to the engine controller 12a. The operator, by adjusting the accelerator operation amount is able to control the rotation speed of the engine 1.

The forward/reverse control member 14 is operated to switch the direction of travel of the vehicle. The forward/reverse control member 14 is operated by the operator switching between a forward travel position, a reverse travel position and a neutral position. The forward/reverse control member 14 sends detection signals showing the position of the forward/reverse control member 14 to the vehicle controller 12. The operator, by operating the forward/reverse control member 14, is able to switch between a forward direction and reverse direction of travel of the wheel loader 50. The tractive force operating member 15 is for example, a switch. The tractive force operating member 15 is operated by the operator for switching tractive force control ON or OFF. The tractive force control is a control for reducing maximum tractive force of the wheel loader 50. In the following explanation, the tractive force control in the OFF condition means the condition in which the tractive force control is not being implemented. The tractive force control in the ON condition means the condition in which the tractive force control is being implemented. A more detailed explanation of the tractive force control is provided subsequently. The tractive force operating member 15 sends detection signals showing the selected position of the tractive force operating member 15 to the vehicle controller 12.

The inching operation part 27 includes an inching operation member 27a and an inching operation sensor 27b. The inching operation member 27a is operated by an operator. The inching operation member 27a is for example, a pedal. The inching operation member 27a provides both inching operation functions and braking operation functions as described subsequently. The inching operation sensor 27b detects operation amount of the inching operation member 27a (hereinafter "inching operation amount") and sends detection signals to the vehicle controller 12. When the inching operation member 27a is operated, the vehicle controller 12 controls the pump displacement control part 7 based on the detection signal from the inching operation sensor 27b. The vehicle controller 12 lowers hydraulic pressure of the pump pilot circuit 32 in compliance with the operation amount of the inching operation member 27a. In this way, drive circuit pressure is lowered and the rotation speed of the traveling hydraulic motor 10 decreases. The inching operation part 27 is used when for example the operator wishes to raise the rotation speed of the engine 1 while suppressing increase in travel speed. That is to say, if the rotation speed of the engine 1 is raised through operation of the accelerator operation member 13a, the hydraulic pressure of the pump pilot circuit 32 rises also. Here, by operating the inching operation member 27a the operator can control rise in the hydraulic pressure of the pump pilot circuit 32. In this way increase in the displacement of the first hydraulic pump 4 is prevented enabling increase in the rotation speed of the traveling hydraulic motor 10 to be prevented. In other words, the inching operation member 27a is operated in order to lower vehicle speed or tractive force without lowering engine rotation speed.

Further, a brake valve 28 is linked to the inching operation member 27a. The brake valve 28 controls supply of hydraulic fluid to a hydraulic brake device 29. The inching operation member 27a thus also operates as a member for operating the hydraulic brake device 29. Until the inching operation amount of the inching operation member 27a reaches a predetermined amount, only the above described inching operation based on detection signals from the inching operation sensor 27b will be performed. When the inching operation amount of the inching operation member 27a reaches the predetermined amount, operation of the brake valve 28 commences, thereby generating braking force for the hydraulic brake device 29. When the inching operation amount of the inching operation member 27a is greater than or equal to a predetermined amount, braking force of the hydraulic brake device 29 is controlled in compliance with the inching operation amount of the inching operation member 27a.

The settings operation device 24 is a device for performing various kinds of settings for the wheel loader 50. The settings operation device 24 is for example a display device with touch panel functionality. As described subsequently, in the tractive force control a control level of tractive force can be set at a first level. The maximum tractive force of the first level is less than the maximum tractive force with the tractive force control in the OFF condition. An operator, by operating the settings operation device 24, can select from a plurality of levels for the magnitude of maximum tractive force of the first level using the tractive force control, and set that selected level. The settings operation device 24 is an example of a tractive force level changing part for changing the magnitude of maximum tractive force of the first level.

Figure 3:
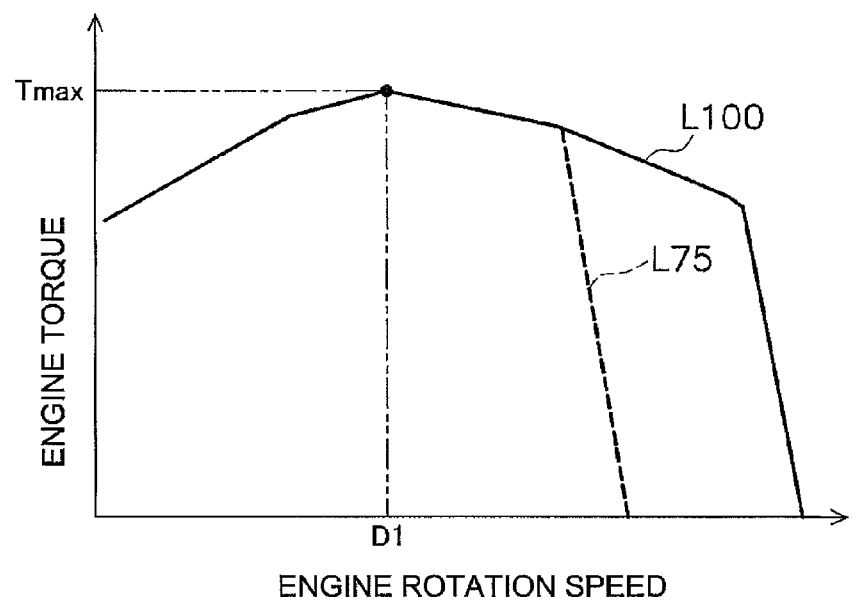
FIG. 3 shows the engine output torque line.

The engine controller 12a is an electronic control part providing an arithmetic unit such as a CPU, or various kinds of memory. The engine controller 12a controls the engine 1 so as to obtain the set target rotation speed. FIG. 3 shows the output torque line of the engine 1. The output torque line of the engine 1 shows the relationship between rotation speed of the engine 1 and the upper limit of engine torque the engine 1 can output for each rotation speed. In FIG. 3 the solid line L100 shows the engine output torque line when the accelerator operation amount is 100%. This engine output torque line is for example, equivalent to the rated value of the engine 1 or maximum power output. Accelerator operation amount at 100% means the condition in which the accelerator operation member 13a is shifted to the maximum extent. Again, the short dashed line L75 shows the engine output torque line when the accelerator operation amount is 75%. The engine controller 12a controls output of the engine 1 such that engine torque is below the engine output torque line. This engine 1 output control is for example performed by controlling the upper value of the quantity of fuel injected to the engine 1.

The vehicle controller 12 is an electronic control part providing an arithmetic unit such as a CPU, or various kinds of memory. The vehicle controller 12 controls the displacement of the first hydraulic pump 4 and the displacement of the traveling hydraulic motor 10 by electronic control of each control valve based on detection signals from each detection part.

Figure 4:
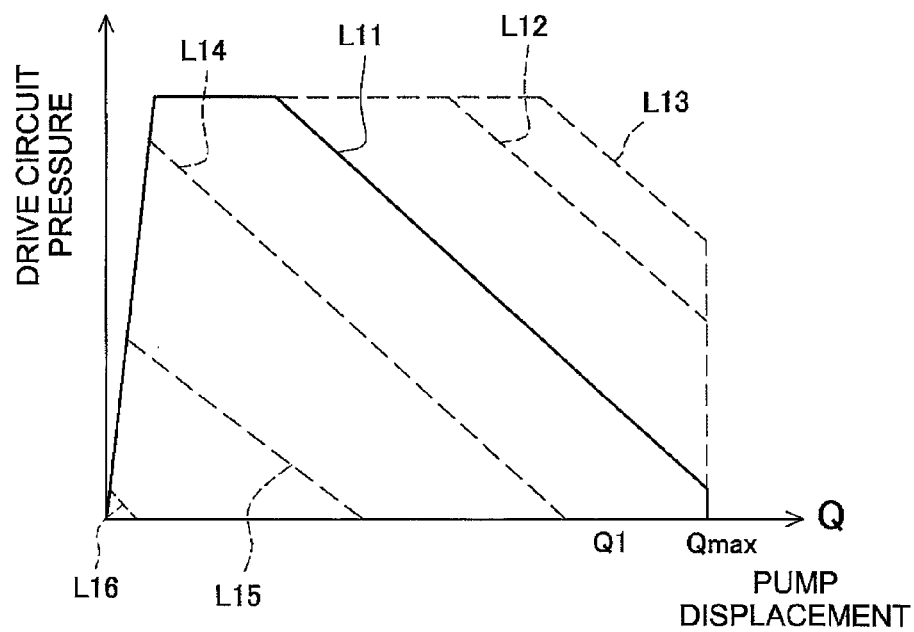
FIG. 4 shows an example of the characteristics of pump displacement to drive circuit pressure.

Basically, the vehicle controller 12 outputs an instruction signal to the pump displacement control part 7 based on engine rotation speed detected by the engine rotation speed sensor 1a. In this way, the relationship between pump displacement and drive circuit pressure is regulated. FIG. 4 shows an example of the characteristics of pump displacement and drive circuit pressure. The characteristics of pump displacement and drive circuit pressure are the relationship between pump displacement and drive circuit pressure. L11-L16 in FIG. 4 are lines that show the changing characteristics of pump displacement in relation to drive circuit pressure in compliance with engine rotation speed. Basically, as the vehicle controller 12 controls the flow volume of the pump displacement control part 7 based on the engine rotation speed, the relationship of pump displacement to drive circuit pressure changes as indicated by L11-L16. In this way, pump displacement is controlled to comply with engine rotation speed and drive circuit pressure.

Figure 5:
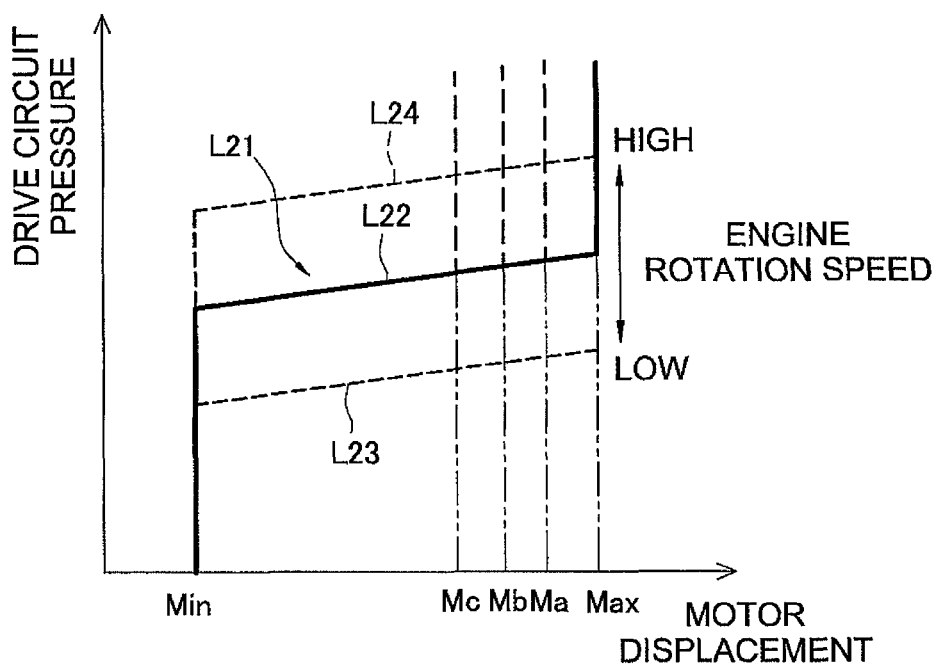
FIG. 5 shows an example of the characteristics of motor displacement to drive circuit pressure.
Figure 6:
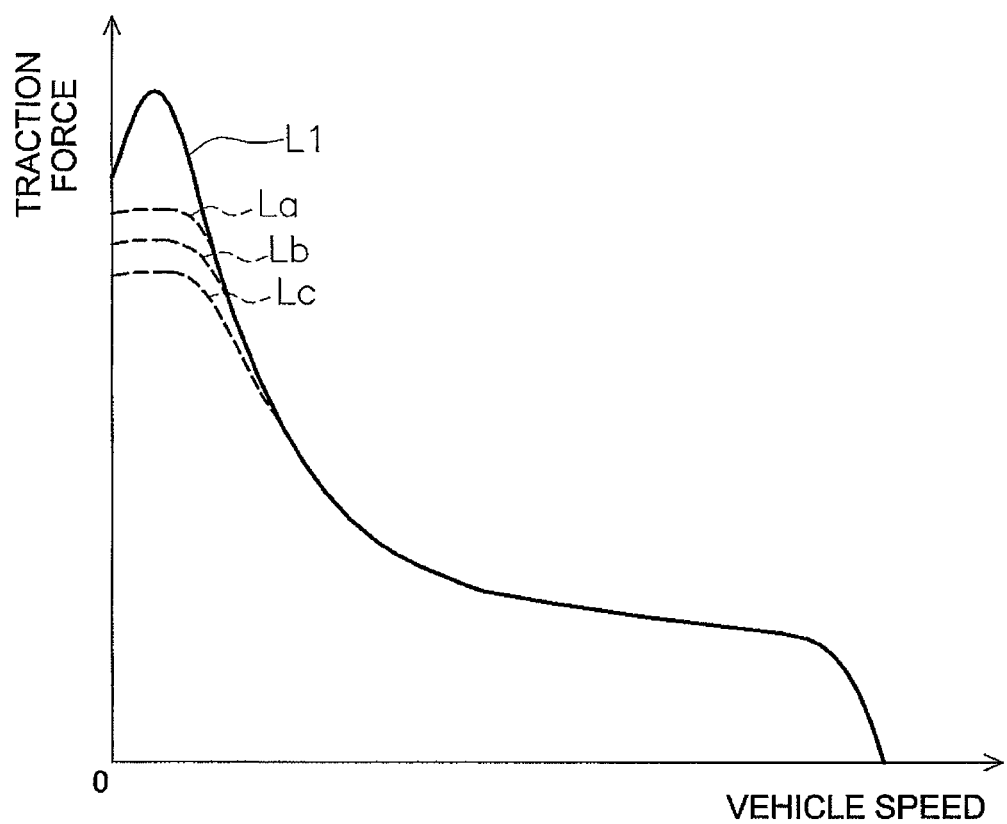
FIG. 6 shows an example of a graph of vehicle speed of the wheel loader and tractive force.

The vehicle controller 12 processes detection signals from the engine rotation speed sensor 1a and the drive circuit pressure detection part 17 and outputs motor displacement instruction signals to the motor displacement control part 11b. Here, the vehicle controller 12 references the characteristics of motor displacement-drive circuit pressure stored in the vehicle controller 12 and sets motor displacement from the value for engine rotation speed and the value for drive circuit pressure. The vehicle controller 12 outputs instructions to change tilting angle in relation to motor displacement as set to the motor displacement control part 11b. FIG. 5 shows an example of the characteristics of motor displacement to drive circuit pressure. In FIG. 5 the solid line L21 is the line that defines motor displacement in relation to drive circuit pressure for conditions representing the values of engine rotation speed. Here, motor displacement corresponds to the tilting angle of the traveling hydraulic motor 10. Until drive circuit pressure falls below a certain value, tilting angle is minimum (Min). Thereafter tilting angle increases gradually as drive circuit pressure increases (the inclined portion of solid line L22). After the tilting angle reaches the maximum (Max), maximum tilting angle (Max) is maintained even though drive circuit pressure rises. The inclined portion L22 defines drive circuit pressure target pressure. In other words, the vehicle controller 12 increases the displacement of the traveling hydraulic motor if drive circuit pressure becomes greater than target pressure. Again, if drive circuit pressure falls below the target pressure, the vehicle controller 12 lowers the displacement of the traveling hydraulic motor. The target pressure is defined in conformance with engine rotation speed. In other words, the inclined portion L22 in FIG. 5 is determined as rising or falling in compliance with the increase or decrease in engine rotation speed. Basically, the inclined portion L22 shows that if engine rotation speed is low, tilting angle increases from the condition in which drive circuit pressure is lower, controlled such that maximum tilting angle is reached with drive circuit pressure in a lower condition (in FIG. 5, the inclined dashed line L23 in the lower part). In the opposite case, if engine rotation speed is high, the minimum tilting angle (Min) is maintained until drive circuit pressure becomes higher, controlled such that maximum tilting angle (Max) is reached with drive circuit pressure in a higher condition (in FIG. 5, dashed line L24 in the upper part). In this way, as shown in FIG. 6, in the wheel loader 50 tractive force and speed change seamlessly without stages, enabling automatic speed change from zero to maximum speed with no speed change operation. The inclined portion L22 in FIG. 5 is shown with the inclination emphasized for ease of understanding, but actually should be almost horizontal. Accordingly, if drive circuit pressure reaches target pressure, motor displacement switches between a minimum value (minimum limiting value) and maximum value (maximum limiting value). However, when drive circuit pressure has reached target pressure the instructed value is not changed immediately and a time delay occurs. This time delay is the reason the inclined portion L22 exists.

The vehicle controller 12 performs the tractive force control by operation of the tractive force operating member 15. The vehicle controller 12 changes tractive force of the vehicle by changing the upper limit displacement of the traveling hydraulic motor 10. As shown in FIG. 5 for example, the vehicle controller 12 outputs an instruction signal to the motor displacement control part 11b in order to change upper limit displacement from Max to any of Ma, Mb or Mc. When the upper limit displacement is changed to Ma, the characteristics of vehicle speed to tractive force change as shown by the line La in FIG. 6. In this way maximum tractive force is lowered in comparison to the line L1 that shows vehicle speed to tractive force in the condition in which the tractive force control is not being implemented. When upper limit displacement is changed to Mb, the characteristics of vehicle speed to tractive force change as indicated by line Lb, as maximum tractive force reduces further. Again, if the upper limit displacement is changed to Mc, the characteristics of vehicle speed to tractive force change as indicated by the line Lc as maximum tractive force decreases still further.

Under the tractive force control maximum tractive force of the vehicle is reduced to maximum tractive force of the first level set in advance. The settings operation device 24 described above, can select from a plurality of levels for the magnitude of maximum tractive force of the first level for the tractive force control and set that level. Basically, the settings operation device 24 can select from three grades of level, Level A, Level B or Level C to set the first level. Level A, is the level of tractive force corresponding to upper limit displacement Ma above. Level B is the level of tractive force corresponding to upper limit displacement Mb above. Level C is the level of tractive force corresponding to upper limit displacement Mc above.

Figure 7:
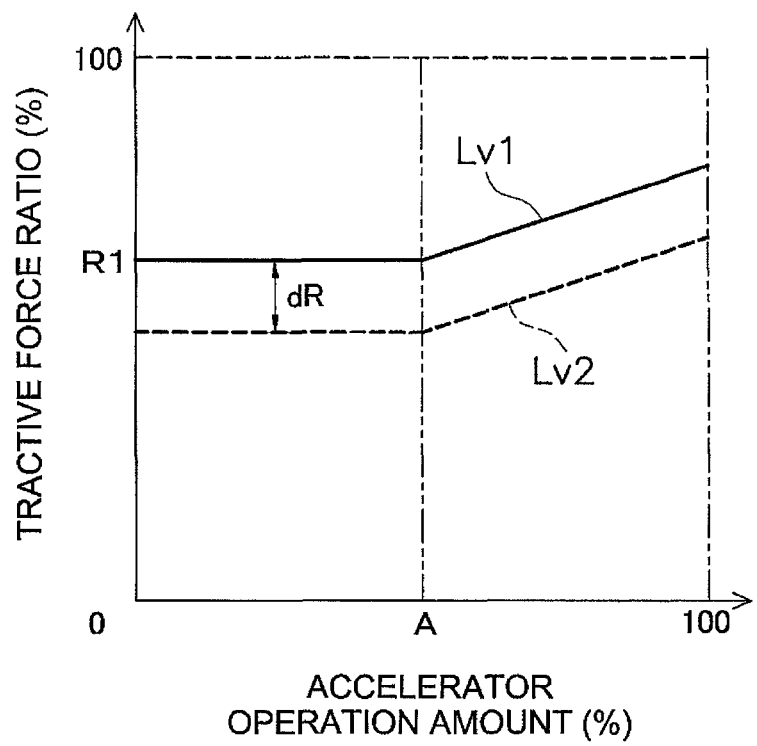
FIG. 7 shows an example of tractive force ratio information.

FIG. 7 shows an example of tractive force ratio information defining the relationship of tractive force ratio to accelerator operation amount. The tractive force ratio shows the ratio of maximum tractive force under the tractive force control when maximum tractive force with the tractive force control in the OFF condition is 100%. In FIG. 7 Lv1 is tractive force ratio information of the first level (hereinafter "first tractive force ratio information"). For the first tractive force ratio information Lv1, when the accelerator operation amount is less than or equal to a predetermined threshold A, the tractive force ratio is constant at R1. When the accelerator operation amount rises above the predetermined threshold A, the tractive force ratio increases in compliance with accelerator operation amount. The vehicle controller 12 controls the upper limit displacement of the traveling hydraulic motor 10 so as to achieve maximum tractive force as shown by the first tractive ratio information Lv1 when the control level of tractive force is set to the first level for the tractive force control.

The vehicle controller 12 changes the control level of tractive force from the first level to the second level when predetermined determination conditions are satisfied during the tractive force control. In FIG. 7 Lv2 is tractive force ratio information of the second level (hereinafter "second tractive force ratio information"). The tractive force ratio of the second level Lv2 is smaller than the tractive force ratio of the first level Lv1. Tractive force ratio of the second level Lv2 is less than tractive force ratio of the first level Lv1 by a predetermined amount of change dR. Amount of change dR should preferably be not less than 5% and not greater than 15%. Amount of change dR should be for example 10%. The vehicle controller 12 controls the upper limit displacement of the traveling hydraulic motor 10 so as to achieve maximum tractive force as shown by the second tractive ratio information Lv2, when the determination conditions are satisfied during the tractive force control. A detailed description of the determination process for automatically lowering tractive force for the tractive force control will now be provided.

Figure 8:
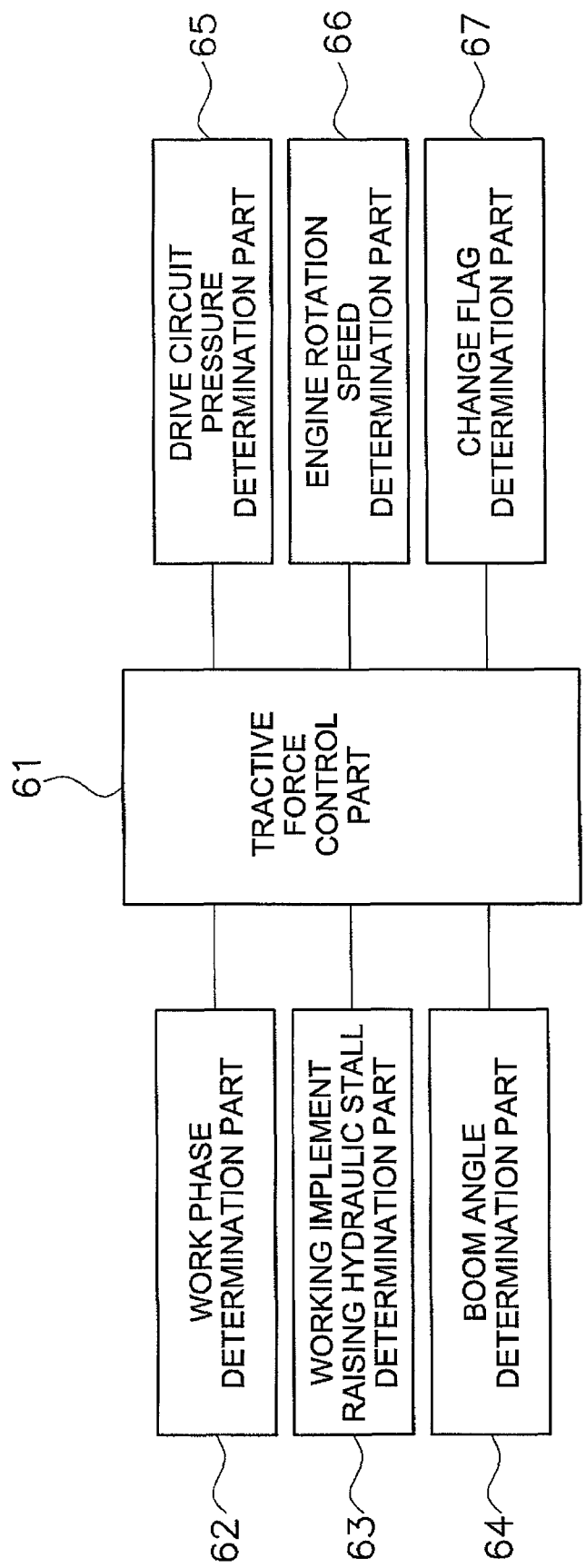
FIG. 8 is a block diagram showing the configuration of a vehicle controller.
Figure 9:
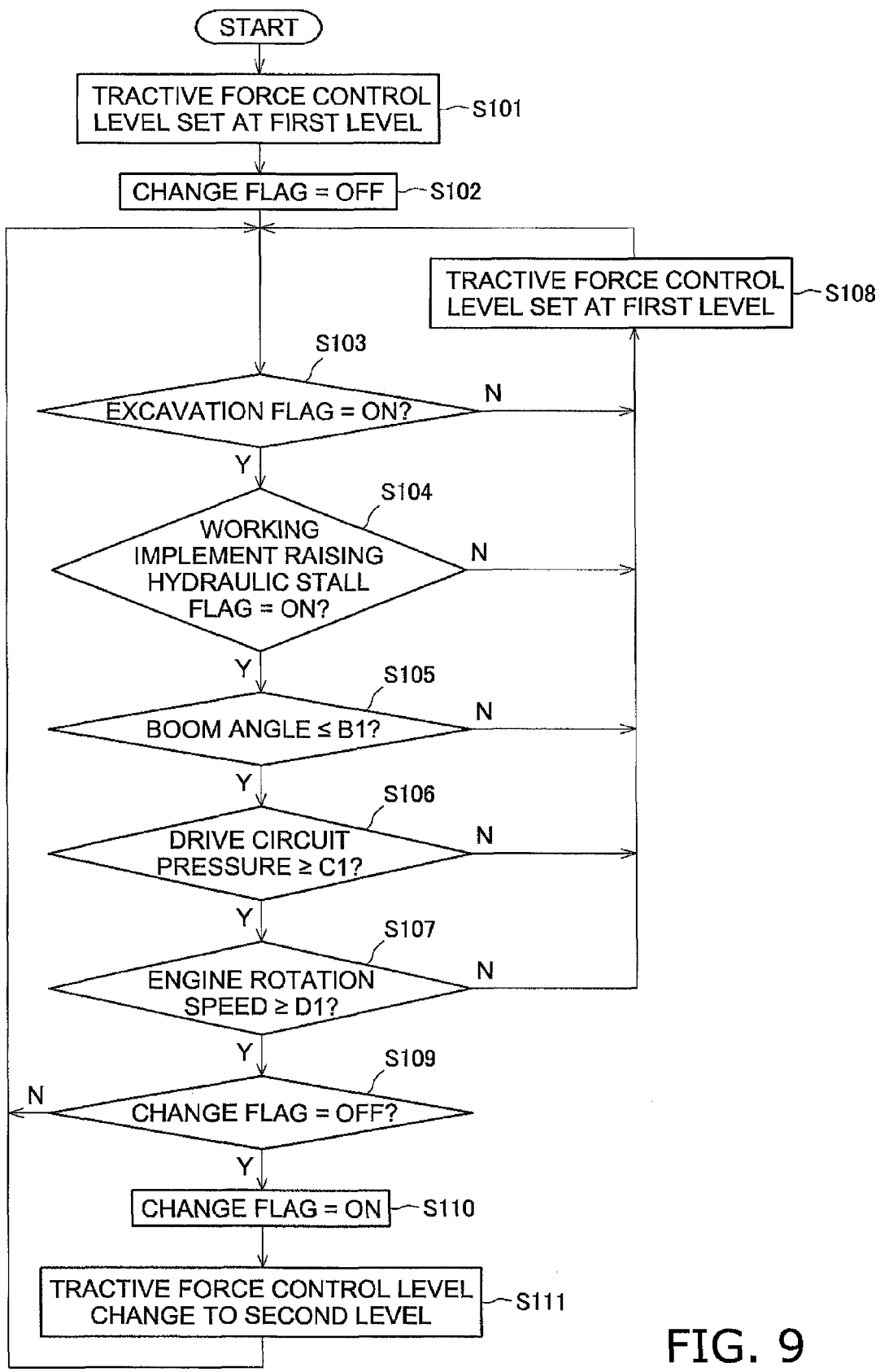
FIG. 9 is a flowchart showing the determination process for automatically reducing maximum tractive force during tractive force control.

As shown in FIG. 8, the vehicle controller 12 includes a the tractive force control part 61, a work phase determination part 62, a working implement raising hydraulic stall determination part 63, a boom angle determination part 64, a drive circuit pressure determination part 65, an engine rotation speed determination part 66 and a change flag determination part 67. FIG. 9 is a flowchart showing the determination process for changing the control level of tractive force from the first level to the second level during the tractive force control. The vehicle controller 12 implements the processes shown in FIG. 9 when the tractive force control is set to the ON condition by operation of the tractive force operating member 15.

At step S101 the tractive force control part 61 sets the control level of tractive force at the first level. At step S102 the tractive force control part 61 sets the change flag to OFF. The change flag is set to ON when the tractive force control level is lowered from the first level to the second level. The change flag is set to OFF when the tractive force control level is not lowered from the first level to the second level. That is to say, when the change flag is OFF, the tractive force control part 61 maintains the control level of tractive force at the first level.

Next, at step S103, the work phase determination part 62 determines whether or not the excavation flag is ON. The excavation flag being ON means that the work phase is excavation. As described subsequently, the work phase determination part 62 determines whether or not the work phase is excavation based on the condition of travel of the vehicle and the operating state of the working implement 52. The work phase determination part 62 sets the excavation flag to ON when the determination is that the work phase is excavation. The work phase determination part 62 sets the excavation flag to OFF when the determination is that the work phase is work other than excavation. A more specific explanation of the process for determination of work phase is provided subsequently.

At step S104, the working implement raising hydraulic stall determination part 63 determines whether or not the working implement raising hydraulic stall flag is ON. The working implement raising hydraulic stall flag being ON means that the working implement 52 is in the raising hydraulic stall condition. The raising hydraulic stall condition is a condition in which the boom 53 does not move even when the working implement operating member 23 is operated to raise the boom. As described subsequently, the working implement raising hydraulic stall determination part 63 determines whether or not the working implement 52 is in the raising hydraulic stall condition based on the operation amount of the working implement operating member 23 and boom pressure as described subsequently. When the working implement raising hydraulic stall determination part 63 determines that the working implement 52 is in the raising hydraulic stall condition, it sets the working implement raising hydraulic stall flag to ON. The working implement raising hydraulic stall determination part 63 sets the raising hydraulic stall flag to OFF if it determines that the working implement is not in the raising hydraulic stall condition. A description of the fundamental processes for determining whether or not the working implement is in the raising hydraulic stall condition is provided subsequently.

Figure 10:
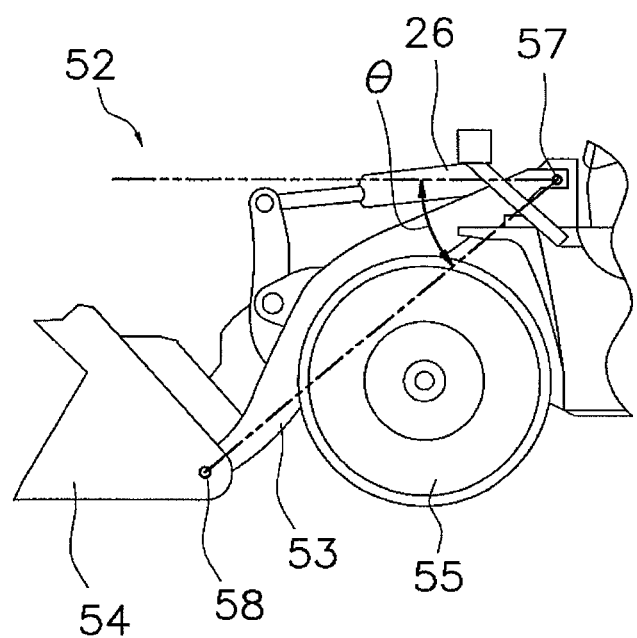
FIG. 10 is a side view of a working implement showing definition of boom angle.

At step S105, the boom angle determination part 64 determines whether or not the boom angle is below a predetermined angle threshold B1. The boom angle determination part 64 makes this determination based on detection signals from the boom angle detection part 38. As shown in FIG. 10 providing a side view, the boom angle is the angle θ between the horizontal direction and the line joining the boom pin 57 and the bucket pin 58, the horizontal direction being 0°. An angle below the horizontal direction is a minus value and an angle above the horizontal direction is a plus value. The boom angle is defined so as to increase toward the upward direction. The angle threshold B1 corresponds to the boom angle with the bucket 54 on the ground surface. For example, the angle threshold B1 is −10°. It is preferable for the angle threshold B1 to be not greater than −20°. The boom angle being below the predetermined angle threshold B1 means that the bucket 54 is in a condition in which it cannot be raised when pushed into the subject material such as earth and sand and the like.

At step S106 the drive circuit pressure determination part 65 determines whether or not drive circuit pressure is above a predetermined hydraulic pressure threshold C1. The drive circuit pressure determination part 65 makes this determination based on detection signals from the drive circuit pressure detection part 17. The hydraulic pressure threshold C1 is a value of a degree that enables it to be deemed that there is sufficient tractive force for the purpose of performing a scooping in operation.

At step S107, the engine rotation speed determination part 66 determines whether or not engine rotation speed is above a predetermined rotation speed threshold D1. The engine rotation speed determination part 66 makes the determination based on detection signals from the engine rotation speed sensor 1*a*. The rotation speed threshold D1 is a value sufficient to prevent a sudden fall in engine rotation speed when the control level of tractive force is lowered from the first level to the second level. As shown in FIG. 3, for the output torque line, the engine rotation speed threshold D1 is the engine rotation speed when the upper limit of engine torque is the maximum value Tmax, that is to say, maximum torque rotation speed.

If at least one of the conditions among the conditions from step S103 to step S107 is not satisfied, step S108 is implemented. At step S108 the tractive force control part 61 sets the tractive force control level at the first level. That is to say, if at least one of the conditions from step S103 through step S107 is not satisfied in the condition in which the control level of tractive force is at the first level, the tractive force control level is maintained at the first level. If at least one of the conditions from among the conditions from step S103 through step S107 is not satisfied in the condition in which the control level of tractive force is at the second level, the control level of tractive force returns from the second level to the first level. Accordingly, the tractive force control part 61 does not lower maximum tractive force when the work phase is not excavation. The tractive force control part 61 does not lower maximum tractive force when the working implement 52 is in the raising hydraulic stall condition. The tractive force control part 61 does not lower maximum tractive force when drive circuit pressure is not greater than or equal to the predetermined hydraulic pressure threshold C1. The tractive force control part 61 does not lower maximum tractive force when the boom angle is not less than or equal to the predetermined angle threshold B1. The tractive force control part 61 does not lower maximum tractive force when the engine rotation speed is not greater than or equal to the engine rotation threshold D1.

When all of the conditions from step S103 to step S107 are satisfied, step S109 is performed. At step S109 the change flag determination part 67 determines whether or not the change flag is OFF. That is to say, the change flag determination part 67 determines whether or not the tractive force control level is at the first level. If the change flag is OFF, in other words, when the tractive force control level is the first level, step S110 is performed.

At step S110 the tractive force control part 61 sets the change flag to ON. Further, at step S111 the tractive force control part 61 changes the control level of tractive force from the first level to the second level. In this way, the tractive force control part 61 controls maximum tractive force based on the second tractive force ratio information Lv2 shown in FIG. 7. In this way, maximum tractive force is lowered.

At step S109, if the change flag is not OFF, the tractive force control level is maintained at the second level and the determinations of step S103 to step S109 are repeated. If any of the conditions from step S103 to step S107 have ceased being satisfied, the control level of tractive force returns from the second level to the first level.

Figure 11:
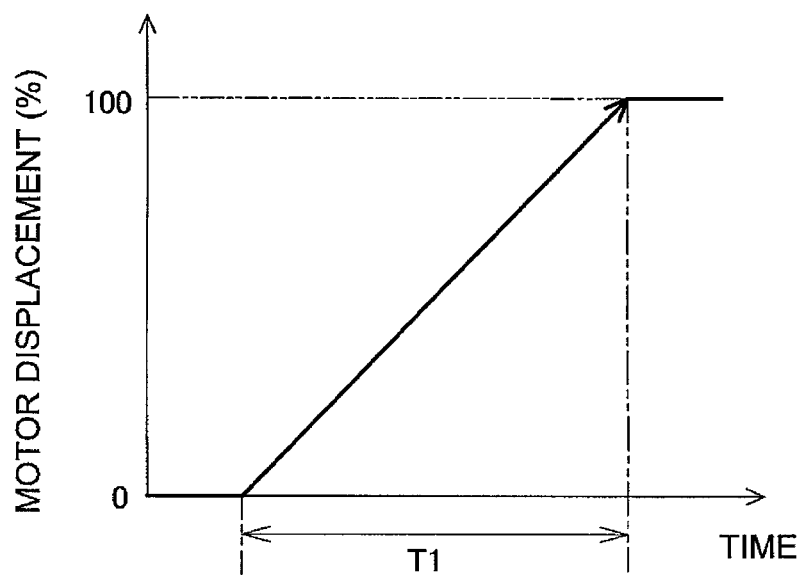
FIG. 11 shows the speed of change of instruction values for the motor displacement when changing the motor displacement.
Figure 11:
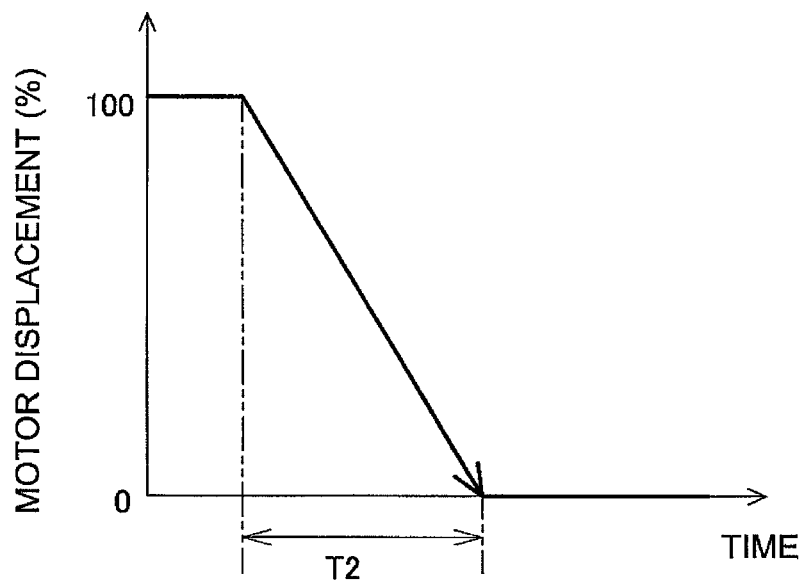

The tractive force control part 61, when returning the tractive force control level from the second level to the first level, makes tractive force change more slowly than when lowering from the first level to the second level. That is to say, when the tractive force control part 61 increases maximum tractive force during the tractive force control, it makes maximum tractive force change more slowly than when lowering maximum tractive force. FIG. 11 (a) shows the speed of change of instruction values of motor displacement when motor displacement is made to increase. FIG. 11 (b) shows the speed of change of instruction values of motor displacement when motor displacement is made to reduce. As shown in FIG. 11 time T1 is greater than time T2. Accordingly, the tractive force control part 61 when increasing maximum tractive force, changes instruction values for motor displacement more slowly than when reducing maximum tractive force.

Figure 12:
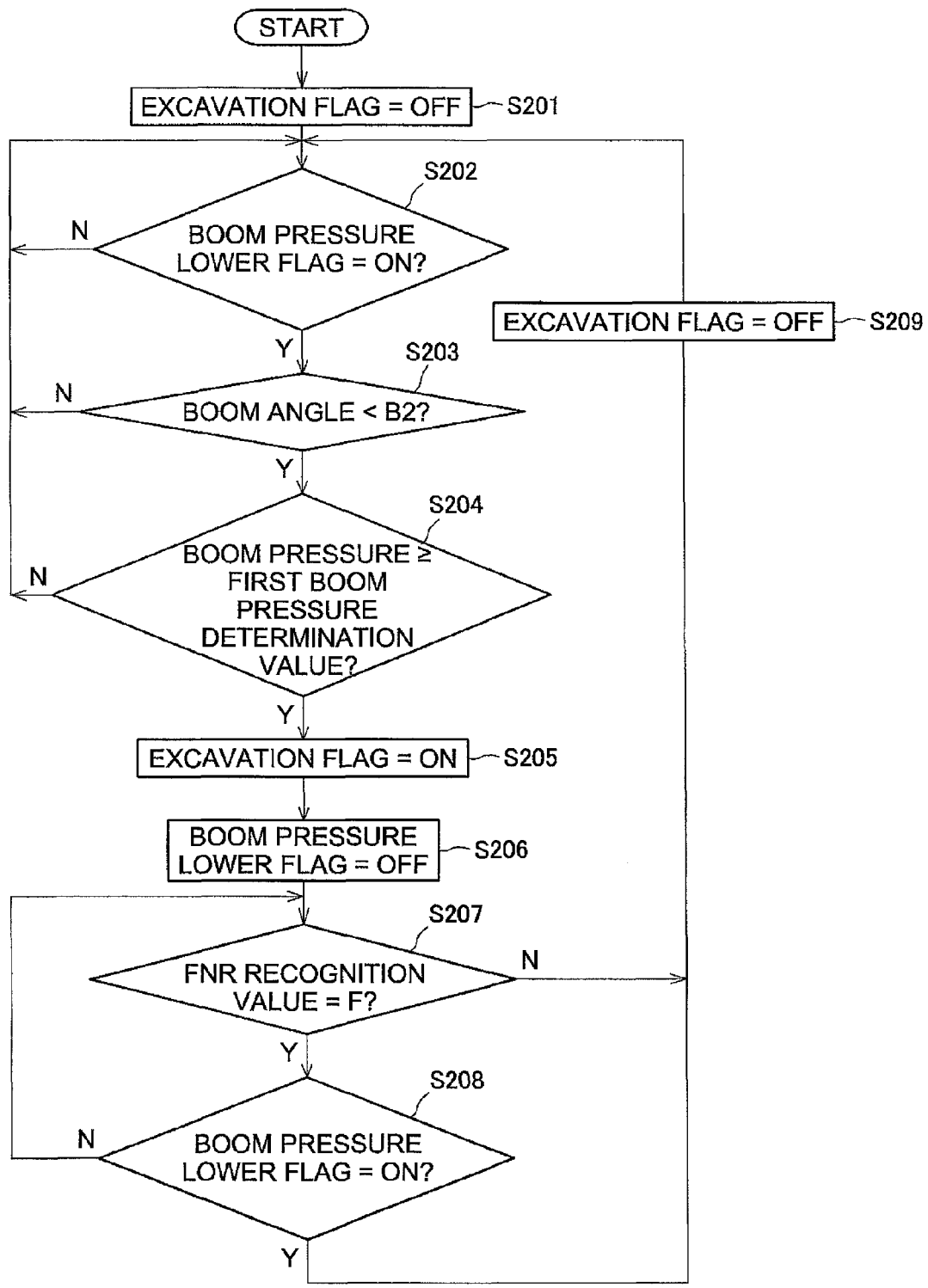
FIG. 12 is a flowchart showing the processes for determining whether or not a work phase is excavation.

FIG. 12 is a flowchart showing the processes for determining whether or not the work phase is excavation. As shown in FIG. 12, at step S201 the work phase determination part 62 sets the excavation flag to OFF. At step S202 the work phase determination part 62 determines whether or not the boom pressure lower flag is ON. The boom pressure lower flag being ON means that the bucket is in the unladen condition. The processes for determination of the status of the boom pressure lower flag are described subsequently.

At step S203 a determination is made as to whether or not the boom angle is less than the predetermined angle threshold B2. The angle threshold B2 corresponds to the boom angle when the bucket is positioned on the ground surface. The angle threshold B2 may be the same as the angle threshold B1 described above.

At step S204 the work phase determination part 62 determines whether or not boom pressure is greater than a first boom pressure determination value. Boom pressure is the pressure supplied to the lift cylinder 19 when the lift cylinder 19 is made to extend. Boom pressure is detected by the boom pressure sensor 22 described above. The first boom pressure determination value is a value for boom pressure obtainable during excavation. A predefined value obtained from experiment or simulation is set as the first boom pressure determination value. The first boom pressure determination value is a value in compliance with the boom angle. The vehicle controller 12 has stored, boom pressure determination value information that shows the relationship between the first boom pressure value and boom angle (hereinafter "first boom pressure value information"). The first boom pressure value information is for example, a table or map showing the relationship between the first boom pressure determination value and boom angle. The work phase determination part 62 determines the first boom pressure determination value in conformance with boom angle by referencing the first boom pressure value information.

If all the conditions from step S202 to step S204 are satisfied, step S205 is performed. At step S205 the work phase determination part 62 sets the excavation flag to ON. That is to say, the work phase determination part 62 determines that the work phase is excavation when all of the conditions from step S202 to step S204 are satisfied. This is because when all of the conditions from step S202 to step S204 are satisfied, it can be understood that the wheel loader 50 has entered the excavation preparation stage. If at least one of the conditions from steps S202, S203 or S204 are not satisfied, the determinations from step S202 to step S204 are repeated.

Further, at step S206, the work phase determination part 62 sets the boom pressure lower flag to OFF. Then, at step S207, the work phase determination part 62 determines whether or not the FNR recognition value is F. The FNR recognition value is information showing which of conditions, a forward travel condition, a reverse travel condition and a neutral condition, is a condition of the vehicle. The FNR recognition value being F means that the vehicle is in the forward travel condition. The FNR recognition value being R means that the vehicle is in the reverse travel condition. The FNR recognition value being N means that the vehicle is in the neutral condition. The work phase determination part 62 determines whether or not the FNR recognition value is F based on detection signals from the forward/reverse control member 14. When the FNR recognition value is not F, step S209 is performed. At step S209 the work phase determination part 62 sets the excavation flag to OFF. That is to say when the vehicle is in the reverse travel condition or in the neutral condition, the excavation flag is set to OFF. At step S207 when the FNR recognition value is F, step S208 is proceeded to.

At step S208, the work phase determination part 62 determines whether or not the boom pressure lower flag is ON. If the boom pressure lower flag is ON, step S209 is implemented. If the boom pressure lower flag is not ON, step S207 is returned to. Accordingly, once the determination is made that the work phase is excavation, thereafter the excavation flag is maintained at ON until either the forward/reverse control member 14 switches from the forward position to the reverse position or the forward/reverse control member 14 switches from the forward position to the neutral position, even if the conditions from step S202 to step S204 cease being satisfied. Note that even if the forward/reverse control member 14 is maintained in the forward position, when the boom pressure lower flag is set to ON, the excavation flag changes to OFF.

Figure 13:
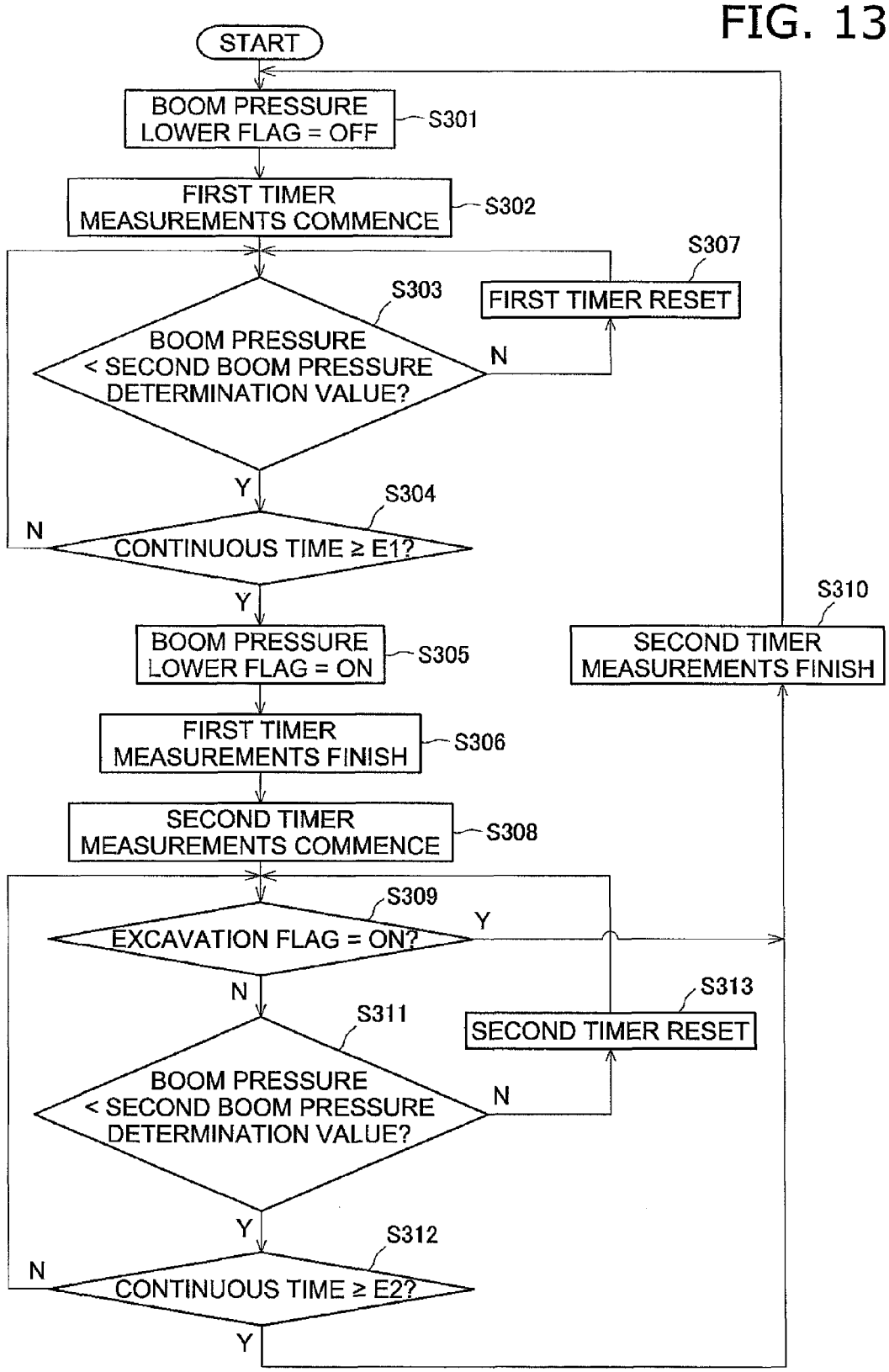

FIG. 13 is a flow chart showing the processes for determining whether or not the boom pressure lower flag is ON. As shown in FIG. 13, at step S301 the work phase determination part 62 sets the boom pressure lower flag to OFF.

At step S302, the work phase determination part 62 commences measurements of a first timer. Here the first timer measures the continuous time during which the conditions for setting the boom pressure lower flag to ON are satisfied.

At step S303 the work phase determination part 62 determines whether or not boom pressure is below a second boom pressure determination value. The second boom pressure determination value is the obtainable boom pressure when the bucket is in the unladen condition. The vehicle controller 12 has stored, boom pressure determination value information that shows the relationship between the second boom pressure determination value and boom angle (hereinafter "second boom pressure value information"). The second boom pressure determination value information is for example, a table or map showing the relationship between the second boom pressure determination value and boom angle. The work phase determination part 62 determines the second boom pressure determination value in conformance with boom angle by referencing the second boom pressure value information. With the second boom pressure value information, when the boom angle is greater than 0°, the second boom pressure determination value is consistent with the value when the boom angle is at 0°. The ratio of increase of boom pressure when the boom angle is greater than or equal to 0° is less than the ratio of increase of boom pressure when the boom angle is less than 0°, thus the second boom pressure determination value when the boom angle is greater than 0° can be proximate to the second boom pressure determination value when the boom angle is at 0°.

At step S304 the work phase determination part 62 determines whether or not time measured by the first timer is greater than or equal to a predetermined time threshold E1. That is to say, a time duration determination part 67 determines whether or not the time duration of the condition in which the conditions of step S303 are satisfied is greater than or equal to a predetermined time threshold E1. The time threshold E1 is set to be a time sufficient to enable it to be deemed that the conditions of step S303 are temporarily not being satisfied. If the time measured by the first timer is not greater than or equal to the predetermined time threshold E1 the determinations of step S303 are repeated. At step S304, if the time measured by the first timer is greater than or equal to the predetermined time threshold E1, step S305 is then proceeded to.

At step S305 the work phase determination part 62 sets the boom pressure lower flag to ON. Then at step S306, the work phase determination part 62 finishes measurements of the first timer. Note that at step S303, if boom pressure is not less than the second boom pressure determination value, step S307 is proceeded to. At step S307 the work phase determination part 62 resets the first timer.

At step S308, the work phase determination part 62 commences measurements of a second timer. Then, at step S309 the work phase determination part 62 determines whether or not the excavation flag is ON. If the excavation flag is ON, step S310 is performed.

At step S310 the work phase determination part 62 finishes the measurements of the second timer. Then the processing returns to step S301 where the work phase determination part 62 sets the boom pressure lower flag to OFF.

At step S309, if the excavation flag is not ON, step S311 is performed. At step S311 the work phase determination part 62 determines whether or not the boom pressure is less than the second boom pressure determination value. If the boom pressure is less than the second boom pressure determination value, step S312 is performed.

At step S312 the work phase determination part 62 determines whether or not time measured by the second timer is greater than or equal to a predetermined time threshold E2. If the time measured by the second timer is greater than or equal to the predetermined time threshold E2, step S310 is proceeded to. At step S310 the work phase determination part 62 finishes measurements of the second timer in the same manner as described above, and at step S301 sets the boom pressure lower flag to OFF. If time measured by the second timer is not greater than or equal to the predetermined time threshold E2, the processing returns to step S309.

Note that at step S311 if boom pressure is not less than the second boom pressure determination value, step S313 is implemented. At step S313 the work phase determination part 62 resets the second timer and returns to step S309.

Figure 14:
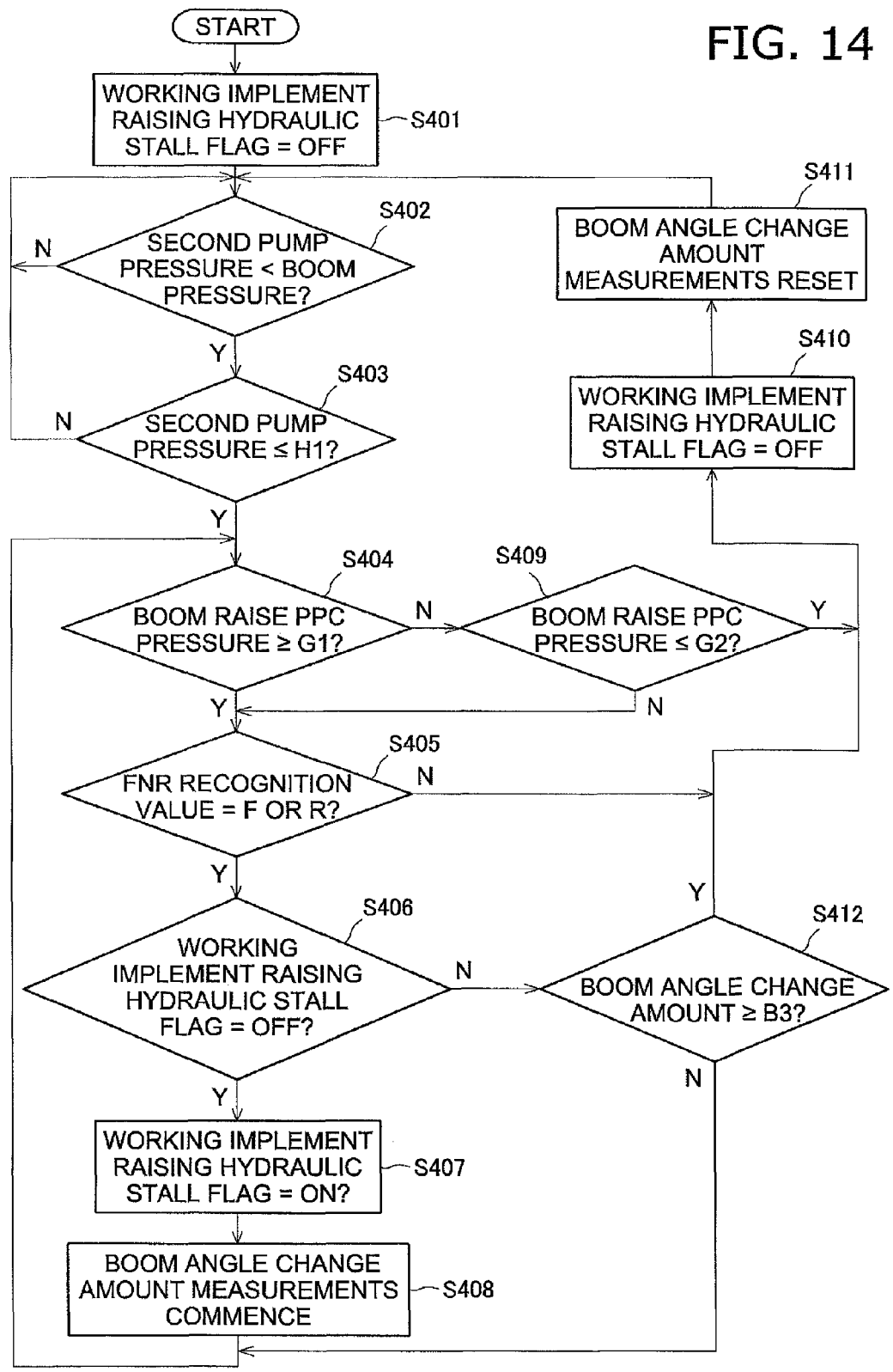
FIG. 14 is a flowchart showing the processes for determining whether or not the working implement is in a raising hydraulic stall condition.

FIG. 14 is a flowchart showing the processes for determining whether or not the working implement raising hydraulic stall flag is ON. As shown in FIG. 14, at step S401 the working implement raising hydraulic stall determination part 63 sets the working implement raising hydraulic stall flag to OFF.

At step S402, the working implement raising hydraulic stall determination part 63 determines whether or not discharge pressure of the second hydraulic pump 2 (hereinafter "second pump pressure") is less than boom pressure. The working implement raising hydraulic stall determination part 63 determines whether or not the second pump pressure is less than boom pressure based on detection signals from the boom pressure sensor 22 and the discharge pressure sensor 39. Second pump pressure being below boom pressure means drive power from the second hydraulic pump 2 is overpowered by the load applied to the lift cylinder 19.

At step S403 the working implement raising hydraulic stall determination part 63 determines whether or not second pump pressure is less than or equal to a predetermined pump pressure threshold H1. The working implement raising hydraulic stall determination part 63 determines whether or not the second pump pressure is less than or equal to pump pressure threshold H1 based on detection signals from the discharge pressure sensor 39. Pump pressure threshold H1 is equivalent to the magnitude of tractive force sufficient for performance of a scooping in operation.

At step S404 the working implement raising hydraulic stall determination part 63 determines whether or not boom raise PPC pressure is greater than or equal to a first PPC pressure threshold G1. Boom raise PPC pressure is pilot pressure that arises due to a boom raise operation from the working implement operating member 23. That is to say, boom raise PPC pressure corresponds to the operation amount of the working implement operating member 23 performed in order to move the boom 53 in the direction to raise it upwards. Boom raise PPC pressure is detected through the PPC pressure sensor 21 described above. The first PPC pressure threshold G1 is a value sufficient to enable it to be deemed that an operator is performing a boom raise operation.

At step S405 the working implement raising hydraulic stall determination part 63 determines whether the FNR recognition value is F or R.

When all of the conditions from step S402 to step S405 are satisfied, step S406 is implemented. At step S406 the working implement raising hydraulic stall determination part 63 determines whether or not the working implement raising hydraulic stall flag is OFF. If the working implement raising hydraulic stall flag is OFF, step S407 is implemented.

At step S407, the working implement raising hydraulic stall determination part 63 sets the working implement raising hydraulic stall flag to ON. Further, at step S408, the working implement raising hydraulic stall determination part 63 commences measuring the amount of change in boom angle. That is to say, the working implement raising hydraulic stall determination part 63 measures the amount of change in boom angle from the point in time at which the working implement raising hydraulic stall flag is set to ON. Step S404 is then returned to.

If the conditions of step S404 among the above described conditions is not satisfied, step S409 is proceeded to. At step S409 the working implement raising hydraulic stall determination part 63 determines whether or not boom raise PPC pressure is less than or equal to the second PPC pressure threshold G2. The second PPC pressure threshold G2 is a value that shows an amount of operation of the working implement operating member 23 sufficient to enable it to be deemed that the operator is not performing a boom raise operation. At step S409 if the boom raise PPC pressure is less than or equal to the second PPC pressure threshold G2, step S410 is proceeded to.

At step S410, the working implement raising hydraulic stall determination part 63 sets the working implement raising hydraulic stall flag to OFF. Accordingly when the working implement raising hydraulic stall flag is ON, at step S410 the working implement raising hydraulic stall determination part 63 returns the working implement raising hydraulic stall flag to OFF. If the working implement raising hydraulic stall flag is OFF, at step S410 the working implement raising hydraulic stall determination part 63 maintains that flag in OFF. That is to say, the working implement raising hydraulic stall determination part 63 determines that the working implement 52 is not in the raising hydraulic stall condition when the boom raising operation has ceased to be performed by the working implement operating member 23. Further, at step S411 the working implement raising hydraulic stall determination part 63 resets the measurement of amount of change of boom angle. That is to say, the working implement raising hydraulic stall determination part 63 measures the amount of change in boom angle for the duration in which working implement raising hydraulic stall is ON.

At step S409 if boom raise PPC pressure is not less than or equal to second PPC pressure threshold G2, step S405 is proceeded to. That is to say if boom raise PPC pressure is a value between first PPC pressure threshold G1 and second PPC pressure threshold G2, no change is made to the working implement raising hydraulic stall flag and the current condition is maintained.

If the conditions of step S405 are not satisfied, the working implement raising hydraulic stall determination part 63 at step S410, sets the working implement raising hydraulic stall flag to OFF. That is to say, the working implement raising hydraulic stall determination part 63 determines that the working implement 52 is not in the raising hydraulic stall condition if the forward/reverse control member 14 is in the neutral position.

If the conditions at step S406 are not satisfied, step S412 is performed. At step S412 the working implement raising hydraulic stall determination part 63 determines whether or not the amount of change in boom angle is greater than or equal to an angle change amount threshold B3. The angle change amount threshold B3 is an amount of change in boom angle sufficient to enable it to be considered that movement of the boom 53 has not stopped. It is preferable for the angle change amount threshold B3 to be less than or equal to 3°. The angle change amount threshold B3 can for example be 1°. When the amount of change in boom angle is greater than or equal to the angle change amount threshold B3, the working implement raising hydraulic stall determination part 63 sets the working implement raising hydraulic stall flag to OFF.

If the conditions at step S402 and step S403 are satisfied, the determinations from step S402 onward are repeated. If the condition at step S412 is not satisfied, step S404 is returned to.

In the wheel loader 50 according to this embodiment, if the above described determination conditions are satisfied during the tractive force control, the control level of tractive force is lowered from the first level to the second level. In this way maximum tractive force is made to reduce. If the determination conditions are satisfied, it means that in a condition in which during excavation work there is sufficient tractive force present, when the operator attempts to raise the bucket 54 the bucket 54 does not rise. The wheel loader 50 according to this aspect enables the working implement 52 to recover from this raising hydraulic stall condition by automatically lowering maximum tractive force when such a condition occurs. Further, as it is not necessary for the operator to perform any operation in order to change the level of maximum tractive force, improved operability can be realized.

The above described determination conditions operate such that when engine rotation speed is smaller than maximum torque rotation speed, maximum tractive force is not lowered. In this way, when maximum tractive force is made to reduce, occurrence of the phenomenon in which engine rotation speed suddenly decreases is prevented.

With the above described determination conditions, the working implement raising hydraulic stall determination part 63 can determine if the boom 53 is in the lowered condition by determining whether or not the boom angle is less than or equal to a predetermined boom angle threshold. This enables accurate determination of the condition in which the boom 53 in the lowered condition is unable to be raised.

An operator, by operating the settings operation device 24, can change the magnitude of maximum tractive force of the first level. If the determination conditions are satisfied, the tractive force control part 61 lowers maximum tractive force to a value smaller than maximum tractive force of the first level. In this way, the operator is able to finely set the required maximum tractive force in conformance with work conditions.

If the determination conditions cease to be satisfied during the tractive force control, the tractive force control part 61 returns the control level of tractive force to the first level. This enables the appropriate maximum tractive force in conformance with work conditions to be obtained.

The tractive force control part 61, when returning the tractive force control level from the second level to the first level, changes pump displacement more slowly than when lowering the tractive force control level from the first level to the second level. This enables sudden increase of tractive force to be prevented, thereby enabling prevention of the occurrence of slips and providing improved operability. Further, the tractive force control part 61, when lowering the control level of tractive force from the first level to the second level, changes pump displacement more quickly than when returning the level of the tractive force control from the second level to the first level. Thus, in the case of the wheel loader 50 of this embodiment, when the working implement 52 has fallen into a condition of raising hydraulic stall the condition can be swiftly rectified.

Although the invention has been described above by reference to an embodiment thereof, the invention is not limited to the embodiment described above. It is therefore understood that numerous modifications and variations can be devised without departing from the scope of the invention.

The above embodiment has been described with reference to an example of a wheel loader 50 mounting an HST system of one pump one motor, including a single hydraulic pump and a traveling hydraulic motor 10. The invention is however, not limited to the embodiment described above. For example, it is also suitable for the present invention to be applied to a wheel loader mounting an HST system of one pump two motors, including a single first hydraulic pump and two traveling hydraulic motors.

In the case of the above described embodiment of the present invention, the settings operation device 24 is able to change maximum tractive force of the first level through three stages. However, it is also suitable if the settings operation device 24 is capable of changing maximum tractive force of the first level in a plurality of stages other than three stages. Alternatively, it is suitable for the settings operation device 24 to be capable of consecutively freely changing the magnitude of maximum tractive force of the first level. Again, it is also suitable for the settings operation device 24 to be omitted, that is to say it is suitable if the maximum tractive force of the first level is unable to be changed.

The determination conditions are not limited to those described above and it is suitable for others to be added. Again, it is also suitable for the above described determination conditions to be changed in part.

In the case of the above described embodiment of the present invention, the tractive force control part 61 lowers maximum tractive force by changing the upper limit displacement of motor displacement, however it is also suitable for maximum tractive force to be lowered by other methods. It is suitable for example for the tractive force control part 61 to lower maximum tractive force by controlling drive circuit pressure. Drive circuit pressure can for example be controlled by controlling displacement of the first hydraulic pump 4.

In the case of the above described embodiment of the present invention, tractive force ratio information is set such that the tractive force ratio increases in conformance with the increase in accelerator operation amount, it is also suitable however for tractive force ratio information to be set such that tractive force ratio is constant, regardless of accelerator operation amount.

The illustrated embodiment provides a wheel loader and method for controlling a wheel loader that enables a working implement to recover from a condition of raising hydraulic stall during excavation work and provides improved operability.

What is claimed is:

1. A wheel loader comprising:
    a working implement including a boom, a bucket and a lift cylinder that raises the bucket by moving the boom;
    an engine;
    a first hydraulic pump driven by the engine;
    a traveling hydraulic motor driven by hydraulic fluid discharged from the first hydraulic pump;
    a second hydraulic pump driven by the engine to discharge hydraulic fluid that drives the lift cylinder;
    a working implement operating member configured to operate the working implement;
    a drive circuit pressure detection part configured to detect a drive circuit pressure that is a pressure of the hydraulic fluid for driving the traveling hydraulic motor;
    a raising hydraulic stall determination part configured to determine whether or not the working implement is in a raising hydraulic stall condition, in which the bucket does not rise regardless of operation of the working implement operating member;
    a drive circuit pressure determination part configured to determine whether or not the drive circuit pressure is greater than or equal to a predetermined hydraulic pressure threshold; and
    a tractive force control part configured to perform a tractive force control to reduce a maximum tractive force, wherein
    the tractive force control part is further configured to reduce the maximum tractive force when determination conditions including, while the working implement is performing excavation operation, that the working implement is in the raising hydraulic stall condition and that the drive circuit pressure is greater than or equal to the predetermined hydraulic pressure threshold are satisfied during the tractive force control.

2. The wheel loader according to claim 1, further comprising:
    an engine rotation speed detection part configured to detect engine rotation speed; and
    an engine rotation speed determination part configured to determine whether or not the engine rotation speed is greater than or equal to a predetermined rotation speed threshold,
    wherein the determination conditions further include that the engine rotation speed is greater than or equal to the predetermined engine rotation speed threshold.

3. The wheel loader according to claim 1, further comprising
    a boom angle determination part configured to determine whether or not a boom angle that is an angle of the boom in relation to a horizontal direction, is less than or equal to a predetermined angle threshold, wherein the determination conditions further include that the boom angle is less than or equal to the predetermined angle threshold.

4. The wheel loader according to claim 1, wherein
    for the tractive force control, the tractive force control part is configured to set a control level of tractive force, which is indicative of a reduction amount of the maximum tractive force, at a first level, and
    the tractive force control part is configured to change the control level of the tractive force to a second level, the maximum tractive force of which is less than the maximum tractive force of the first level when the determination conditions are satisfied during the tractive force control.

5. The wheel loader according to claim 4, further comprising
    a tractive force level changing part configured to change magnitude of the maximum tractive force of the first level.

6. The wheel loader according to claim 4, wherein
    the tractive force level changing part is configured to return the tractive force control level to the first level when the determination conditions cease being satisfied during the tractive force control.

7. The wheel loader according to claim 6, wherein
    the tractive force level changing part is configured to change tractive force when returning the tractive force control level to the first level, more slowly than when changing the tractive force control level to the second level.

8. The wheel loader according to claim 1, wherein
the tractive force control part is configured to determine whether or not the working implement is performing the excavation operation based on a condition of travel of the wheel loader and an operating state of the working implement.

9. The wheel loader according to claim 1, further comprising
a boom pressure detection part configured to detect a pressure of hydraulic fluid supplied to the lift cylinder, wherein
the raising hydraulic stall determination part is configured to determine whether or not the working implement is in the raising hydraulic stall condition based on an operation amount of the working implement operating member and the pressure of hydraulic fluid supplied to the lift cylinder.

10. The wheel loader according to claim 1, further comprising
a forward/reverse travel control member configured to change a direction of travel of the wheel loader by switching between a forward travel position, a reverse travel position and a neutral position, wherein
the raising hydraulic stall determination part is configured to determine that the working implement is not in the raising hydraulic stall condition when the forward/reverse travel control member is in the neutral position.

11. The wheel loader according to claim 2, wherein
the predetermined rotation speed threshold is, for an output torque line that shows a relationship between the engine rotation speed and an upper limit of engine torque the engine can output at each engine rotation speed, the engine rotation speed when the upper limit of the engine torque reaches the maximum.

12. The wheel loader according claim 1, wherein
the tractive force control part is configured to control a displacement of the traveling hydraulic motor by controlling a tilting angle of the traveling hydraulic motor and to perform control of the maximum tractive force by controlling an upper limit displacement of the displacement of the traveling hydraulic motor.

13. The wheel loader according to claim 1, wherein
the tractive force control part is configured not to reduce the maximum tractive force when the working implement is not performing the excavation operation.

14. The wheel loader according to claim 1, wherein
the tractive force control part is configured not to reduce the maximum tractive force when the working implement is not in the raising hydraulic stall condition.

15. The wheel loader according to claim 1, wherein
the tractive force control part is configured not to reduce the maximum tractive force when the drive circuit pressure is not greater than or equal to the predetermined hydraulic pressure threshold.

16. The wheel loader according to claim 2, wherein
the tractive force control part is configured not to reduce the maximum tractive force when the engine rotation speed is not greater than or equal to the predetermined rotation speed threshold.

17. The wheel loader according to claim 3, wherein
the tractive force control part is configured not to increase the maximum tractive force when the boom angle is less than or equal to the predetermined angle threshold.

18. A method for controlling a wheel loader including an engine and a working implement including a boom, a bucket and a lift cylinder that raises the bucket by moving the boom, the method comprising:
determining whether or not a raising hydraulic stall condition is occurring, in which the bucket does not rise even though hydraulic fluid discharged from a second hydraulic pump, which is driven by the engine, is supplied to the lift cylinder;
determining whether or not a drive circuit pressure of a drive circuit, through which hydraulic fluid discharged from a first hydraulic pump driven by the engine is supplied to a traveling hydraulic motor, is greater than or equal to a predetermined hydraulic pressure threshold; and
during a tractive force control for reducing a maximum tractive force is performed, further reducing a maximum tractive force when determination conditions including, while the working implement is performing excavation operation, that the raising hydraulic stall condition is occurring and that the drive circuit pressure is greater than or equal to the predetermined hydraulic pressure threshold are satisfied.

* * * * *